(12) United States Patent
Chen et al.

(10) Patent No.: US 8,271,665 B2
(45) Date of Patent: Sep. 18, 2012

(54) INTERNET PROTOCOL CAMERA MANAGEMENT SYSTEM AND METHOD

(75) Inventors: Yang-Yuan Chen, Taipei Hsien (TW); Ming-Chih Hsieh, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 294 days.

(21) Appl. No.: 12/844,809

(22) Filed: Jul. 27, 2010

(65) Prior Publication Data

US 2011/0289228 A1 Nov. 24, 2011

(30) Foreign Application Priority Data

May 19, 2010 (TW) ............................... 99115902 A

(51) Int. Cl.
*G06F 15/16* (2006.01)

(52) U.S. Cl. .......... 709/228; 348/262; 348/722; 348/47; 348/229.1; 348/211.3; 370/419; 370/316

(58) Field of Classification Search ................... 709/228
See application file for complete search history.

(56) References Cited

U.S. PATENT DOCUMENTS

| | | | |
|---|---|---|---|
| 7,391,440 B2 * | 6/2008 | Rooy et al. | 348/211.4 |
| 7,916,180 B2 * | 3/2011 | Olsen et al. | 348/218.1 |
| 2009/0059945 A1 * | 3/2009 | Yokomitsu et al. | 370/419 |

* cited by examiner

*Primary Examiner* — Jude Jean Gilles
(74) *Attorney, Agent, or Firm* — Altis Law Group, Inc.

(57) ABSTRACT

An Internet Protocol (IP) camera management system and method determines a MAC address of an IP camera corresponding to a communication channel, searches an IP address of the IP camera through the determined MAC address of the IP camera, then establishes connection between the IP camera management system and the IP camera through the searched IP address. Furthermore, video image data are acquired from the IP camera through the communication channel and are displayed on a display interface.

17 Claims, 3 Drawing Sheets

INTERNET PROTOCOL CAMERA MANAGEMENT SYSTEM AND METHOD

BACKGROUND

1. Technical Field

Embodiments of the present disclosure relates to network management systems and methods, and more particularly, to an Internet Protocol (IP) camera management system and method.

2. Description of Related Art

Internet Protocol (IP) cameras are also referred to as network cameras. The IP cameras use the Internet Protocol to transmit captured image data to a control center through communication channels, so that users can remotely monitor and manage the IP cameras on the control center. As a network device, each IP camera has a unique IP address assigned by a dynamic host configuration protocol (DHCP) server. Each communication channel, which often refers to a physical transmission medium (such as wired or wireless) configured by the control center, corresponds to a unique media access control (MAC) address of an IP camera.

Sometimes, connection between the control center and the an IP camera may be interrupted for various reasons, such as network errors, and the IP camera may be assigned a new IP address by the DHCP server. However, the new IP address sometimes may not be found by the control center, the control center may still try to connect to the IP camera using the original IP address of the IP camera. As a result, the connection between the control center and the IP camera may not be resumed in time.

DETAILED DESCRIPTION

The disclosure is illustrated by way of examples and not by way of limitation in the figures of the accompanying drawings in which like references indicate similar elements. It should be noted that references to "an" or "one" embodiment in this disclosure are not necessarily to the same embodiment, and such references mean at least one.

In general, the word "module," as used hereinafter, refers to logic embodied in hardware or firmware, or to a collection of software instructions, written in a programming language, such as, for example, Java, C, or Assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of computer-readable medium or other computer storage device.

Figure 1:
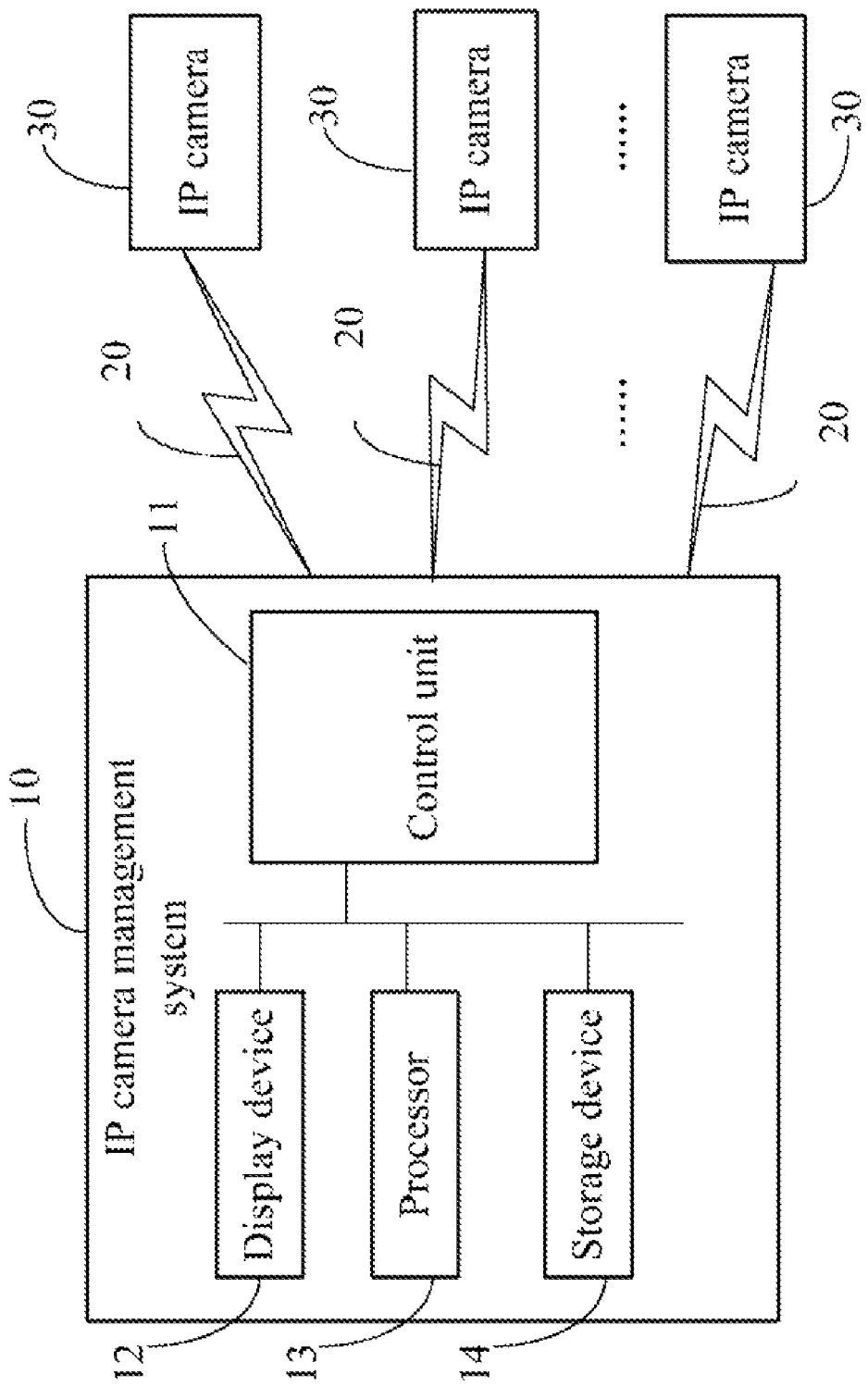
FIG. 1 is a block diagram of one embodiment of an Internet Protocol (IP) camera management system.

FIG. 1 is a block diagram of one embodiment of an Internet Protocol (IP) camera management system 10. In one embodiment, one or more IP cameras (three are shown) 30 are connected to the IP camera management system 10 through one or more communication channels 20. The communication channels 20 may be wired or wireless, depending on the embodiment. Each IP camera 30 is allocated an IP address by a dynamic host configuration protocol (DHCP) server (not shown). The IP camera 30 captures video image data of designated monitored area (e.g., automatic teller machines), and transmits the video image data to the IP camera management system 10 through a corresponding communication channel 20. Even though the IP address of the IP camera 30 may be dynamically changed by the DHCP server, the IP camera 30 still has a unique media control access (MAC) address on the Internet. Therefore, each communication channel 20 corresponds to a MAC address of an IP camera 30.

In one embodiment, the IP camera management system 10 includes a control unit 11, a display device 12, a processor 13, and a storage device 14. The control unit 11 establishes connection between the IP camera management system 10 and the IP cameras through the communication channels 20, acquires video image data from the IP cameras 30, records the video image data in the storage device 14, and displays the video image data on the display device 12. One or more computerized codes of the control unit 11 are stored in the storage device 14, where the processor 13 executes the one or more computerized codes, to provide one or more aforementioned operations of the control unit 11.

Depending on the embodiment, the storage device 14 may be a smart media card, a secure digital card, or a compact flash card. The display device 12 may be a liquid crystal display (LCD), or a cathode ray tube (CRT) display.

Figure 2:
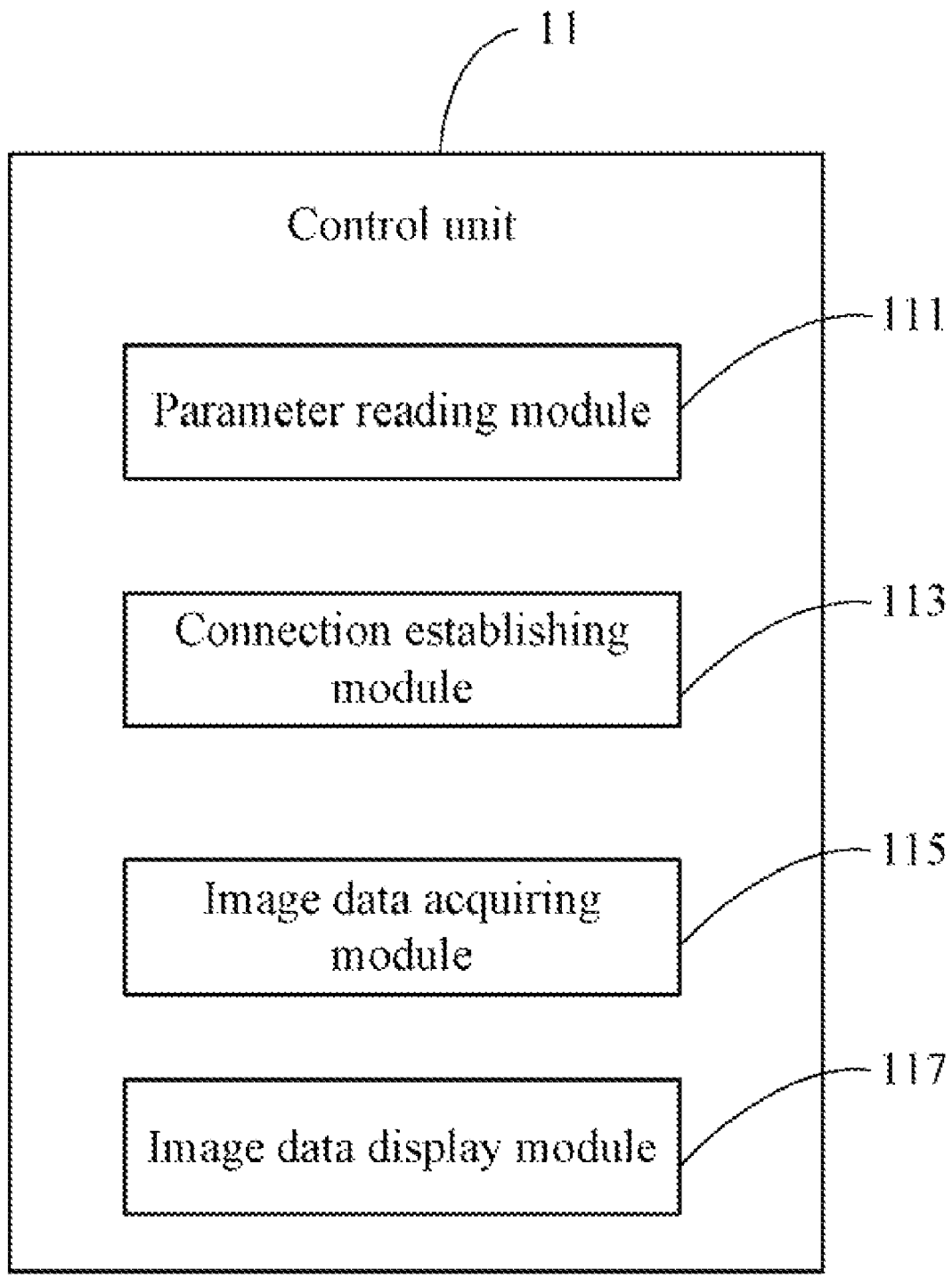
FIG. 2 is a block diagram of one embodiment of function modules of a control unit in FIG. 1.

As shown in FIG. 2, the control unit 11 may include a parameter reading module 111, a connection establishing module 113, an image data acquiring module 115, and an image data display module 117.

The parameter reading module 111 reads controlling parameters of the IP cameras 30 from the storage device 14. In one embodiment, the controlling parameters include a total number (e.g., sixteen) of the communication channels 20 for transmitting video image data captured by the IP cameras 30, a number of each communication channel (e.g., "channel 1" to "channel 16") 20, and a MAC address of an IP camera 30 corresponding to each communication channel 20.

The connection establishing module 113 selects a communication channel 20 and determines a MAC address of an IP camera 30 corresponding to the communication channel 20 according to the read controlling parameters. Furthermore, the connection establishing module 113 searches an IP address of the IP camera 30 on the Internet according to the determined MAC address of the IP camera 30. In addition, the connection establishing module 113 establishes the connection between the IP camera management system 10 and the IP camera 30 through the searched IP address.

The image data acquiring module 115 acquires video image data from the IP camera 30 through the communication channel 20, and records the acquired video image data in the storage device 14.

The image data display module 117 provides a display interface for each communication channel 20 on the display device 12, and displays the video image data acquired from the IP camera 30 corresponding to the communication channel 20 on the display interface. For example, if there are totally sixteen communication channels 20, the image data display module 117 displays sixteen display interfaces on the display device 12, and each display interface displays video image data transmitted by a corresponding communication channel 20.

Figure 3:
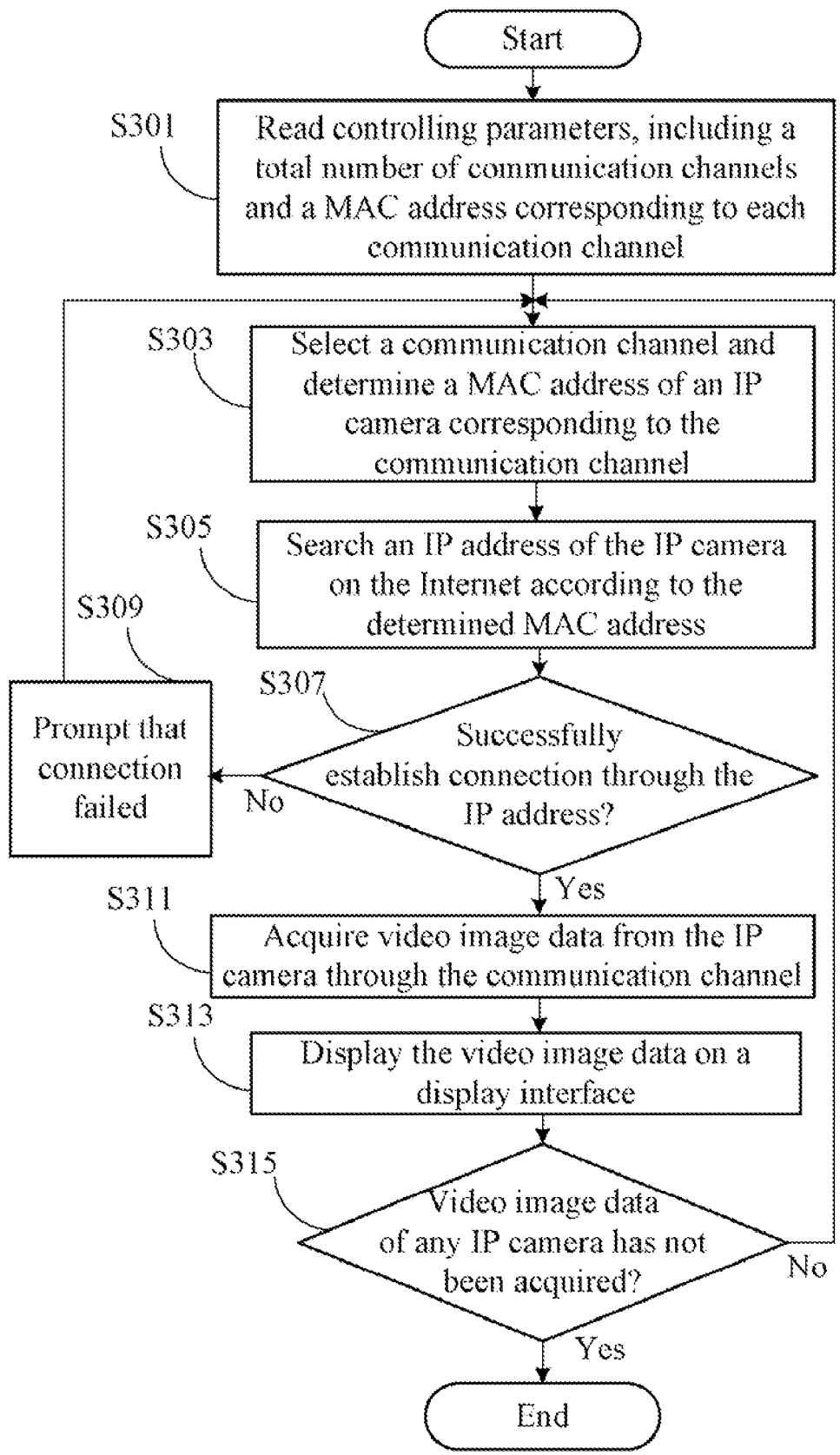
FIG. 3 is a flowchart of one embodiment of an IP camera management method.

FIG. 3 is a flowchart of one embodiment of an IP camera management method. Depending on the embodiment, additional blocks may be added, others removed, and the ordering of the blocks may be changed.

In block S301, the parameter reading module 111 reads controlling parameters of the communication channels 20 from the storage device 14. In one embodiment, the controlling parameters include the total number of the communication channels 20 for transmitting video image data captured by the IP cameras 30, a number of each communication channel 20, and a MAC address of an IP camera 30 corresponding to each communication channel 20. As mentioned above, there may be totally sixteen communication channels 20, which are numbered from "channel 1" to "channel 16."

In block S303, the connection establishing module 113 selects a communication channel 20 and determines a MAC address of an IP camera 30 corresponding to the communication channel 20 according to the read controlling parameters.

In block S305, the connection establishing module 113 searches an IP address of the IP camera 30 on the Internet according to the determined MAC address of the IP camera 30.

In block S307, the connection establishing module 113 tries to establish connection between the IP camera management system 10 and the IP camera 30 through the searched IP address. If the connection has not been successfully established, in block S309, the connection establishing module 113 displays a dialog box on the display device 14 to inform a user of the IP camera management system 10 of connection failure, and the procedure returns to block S303. The connection failure includes the IP camera 30 not being powered on, or a temporary power cut occurs to the IP camera 30, for example. Otherwise, if the connection has been successfully established, the procedure goes to block S311.

In block S311, the image data acquiring module 115 acquires video image data from the IP camera 30 through the communication channel 20, and records the acquired video image data in the storage device 14.

In block S313, the image data display module 117 provides a display interface for the communication channel 20 on the display device 12, and displays the acquired video image data on the display interface. In this embodiment, each communication channel 20 corresponds to a display interface on the display device 14, and each display interface displays video image data captured by an IP camera 30 corresponding to the communication channel 20.

In block S315, the image data acquiring module 115 determines that if video image data of any IP camera 30 has not been acquired. If the image data acquiring module 115 determines that video image data of any IP camera 30 has not been acquired, the procedure returns to block S303, until video image data of all IP cameras 30 has been acquired, the procedure ends.

The above embodiments first search an IP address of an IP camera 30 through MAC addresses of the IP camera 30, then establish connection between the IP camera management system 10 and the IP camera 30 through the searched IP address. As a result, even though the IP address of the IP camera 30 may be dynamically changed, the IP camera management system 10 can resume connection between the IP camera 30 in time.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. An Internet Protocol (IP) camera management method, the method comprising:

reading controlling parameters of one or more IP cameras from a storage device, wherein the controlling parameters comprise a total number of one or more communication channels for transmitting video image data captured by the one or more IP cameras, a number of each communication channel, and a media access control (MAC) address of an IP camera corresponding to each communication channel;

selecting a communication channel and determining a MAC address of an IP camera corresponding to the communication channel according to the read controlling parameters;

searching an IP address of the IP camera on the Internet according to the determined MAC address of the IP camera;

establishing connection between an IP camera management system and the IP camera through the searched IP address; and acquiring video image data from the IP camera through the communication channel.

2. The method as claimed in claim 1, further comprising: recording the acquired video image data in the storage device.

3. The method as claimed in claim 1, further comprising: displaying the acquired video image data on a display device.

4. The method as claimed in claim 3, wherein each communication channel corresponds to a display interface on the display device, and each display interface displays video image data captured by an IP camera corresponding to the communication channel.

5. The method as claimed in claim 1, further comprising:
determining if video image data of any IP camera has not been acquired; and
returning to the selecting block in response that video image data of any IP camera has not been acquired.

6. The method as claimed in claim 1, wherein the storage device is selected from the group consisting of a smart media card, a secure digital card, and a compact flash card.

7. An Internet Protocol (IP) camera management system, comprising:
a storage device;
at least one processor; and
a control unit being stored in the storage device and executable by the at least one processor, the control unit comprising:
a parameter reading module operable to read controlling parameters of the IP cameras from the storage device, wherein the controlling parameters comprise a total number of one or more communication channels for transmitting video image data captured by the one or more IP cameras, a number of each communication channel, and a media access control (MAC) address of an IP camera corresponding to each communication channel;
a connection establishing module operable to select a communication channel, determine a MAC address of an IP camera 30 corresponding to the communication channel according to the read controlling parameters, search an IP address of the IP camera on the Internet according to the determined MAC address, and establish connection between the IP camera management system and the IP camera through the searched IP address; and
an image data acquiring module operable to acquire video image data from the IP camera through the communication channel.

8. The system as claimed in claim 7, wherein the image data acquiring module is further operable to record the acquired video image data in the storage device.

9. The system as claimed in claim 7, wherein the control unit further comprises an image data display module operable to display the acquired video image data on a display device.

10. The system as claimed in claim 9, wherein the displaying module provides a display interface for each communication channel on the display device, and each display interface displays video image data captured by an IP camera corresponding to the communication channel.

11. The system as claimed in claim 7, wherein the storage device is selected from the group consisting of a smart media card, a secure digital card, and a compact flash card.

12. A non-transitory computer readable medium storing a set of instructions, the set of instructions capable of being executed by a processor to perform an Internet Protocol (IP) camera management method, the method comprising:
  reading controlling parameters of one or more IP cameras from the non-transitory computer readable medium, wherein the controlling parameters comprise a total number of one or more communication channels for transmitting video image data captured by the one or more IP cameras, a number of each communication channel, and a media access control (MAC) address of an IP camera corresponding to each communication channel;
  selecting a communication channel and determining a MAC address of an IP camera corresponding to the communication channel according to the read controlling parameters;
  searching an IP address of the IP camera on the Internet according to the determined MAC address of the IP camera;
  establishing connection between an IP camera management system and the IP camera through the searched IP address; and
  acquiring video image data from the IP camera through the communication channel.

13. The non-transitory computer readable medium as claimed in claim 12, wherein the method further comprises:
  recording the acquired video image data in the non-transitory computer readable medium.

14. The non-transitory computer readable medium as claimed in claim 12, wherein the method further comprises: displaying the acquired video image data on a display device.

15. The non-transitory computer readable medium as claimed in claim 12, wherein each communication channel corresponds to a display interface on the display device, and each display interface displays video image data captured by an IP camera corresponding to the communication channel.

16. The non-transitory computer readable medium as claimed in claim 12, wherein the method further comprises:
  determining that if video image data of any IP camera has not been acquired; and
  returning to the selecting block in response that video image data of any IP camera has not been acquired.

17. The non-transitory computer readable medium as claimed in claim 12, wherein the non-transitory computer readable medium is selected from the group consisting of a smart media card, a secure digital card, and a compact flash card.

* * * * *